INVENTOR;
RICHARD O. CHAKROFF,
BY
Jerome R. Cox
ATT'Y.

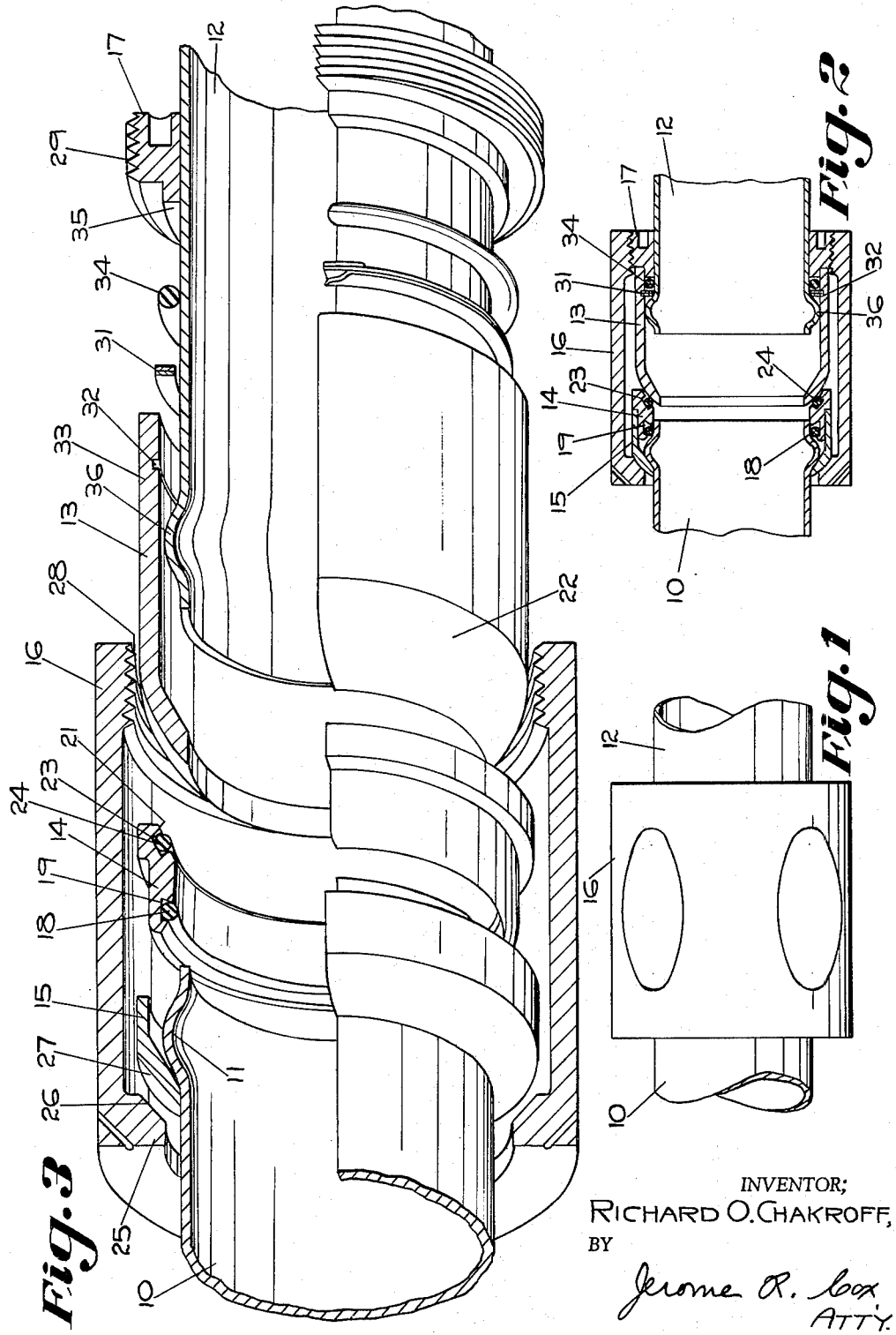

United States Patent Office 3,002,771
Patented Oct. 3, 1961

3,002,771
COUPLING DEVICES
Richard O. Chakroff, 298 Park Blvd., Worthington, Ohio
Filed July 31, 1959, Ser. No. 830,795
9 Claims. (Cl. 285—165)

The invention disclosed and claimed in this application relates to coupling devices for joining conduits together. This application is a continuation-in-part of my copending application Serial No. 782,232, filed December 22, 1958, entitled Coupling Assembly, now abandoned, and my application Serial No. 822,508, filed June 24, 1959, entitled Couplings, and the disclosure hereof includes embodiments similar to the embodiments disclosed in said copending applications as well as additional improvements in combination therewith. The embodiments of my invention disclosed herein relate especially to mechanism and methods for connecting together tubing, especially tubing of the type which is used for aircraft conduits.

Embodiments of my invention disclosed in this application show specifically couplings for securing together aircraft conduits (a) of the type in which the end of the conduit is beaded and (b) of the type of which the end of the coupling is flared. They show couplings comprising coupling members or sections that can readily be joined together without either (1) the necessity of precisely aligning the longitudinal axis of the tubing to be joined, or (2) the necessity of precisely and accurately positioning longitudinally the ends of the tubing to be joined. Thus, my couplings provide (for aircraft conduits of the flared and beaded types) compensation for radial misalignment and also take-up for longitudinal mismatch and for expansion or contraction of materials due to temperature changes.

In general, the coupling assembly of the present invention includes, a pair of aircraft conduits having either beaded or flared ends with the ends approximately aligned with each other and a coupling assembly for coupling said conduits together, the coupling assembly including like the couplings disclosed in my copending applications Serial No. 782,232 and Serial No. 822,508, (1) a male coupling member the outer side or face of one end of which is formed as an annular segment of a spherical surface; (2) a female coupling member the inner face or side of which is formed as an annular segment of an internal surface, engaging with the spherical surface of the male coupling portion at a single line of tangency; and (3) a clamping means. The other face or side of the female coupling member is also formed as an annular segment of a spherical surface. The clamping means has an annular segment of an interior surface which engages the spherical surface on the outer face of said end of the female coupling with a circular line contact and so urges the contacting surfaces of the two coupling members into sealed contact at a single line of tangency. The center of the arcs of the above two mentioned spherical surfaces are coincident whereby substantial rotational sliding engagement can occur between such spherical surfaces and their respective confronting surfaces so as to permit the clamping means to draw the male and female coupling portions together into sealed relationship notwithstanding the misalignment of the longitudinal axes of the coupling portions.

Each of the embodiments of the present invention includes a pair of aircraft conduit members formed either with flanged ends or beaded ends and a coupling assembly for securing and coupling these two conduits together. Each of the coupling assemblies comprises a male coupling member, the outer face or side of one end of which is formed as an annular segment of a spherical surface and a female coupling member the inner face or side of which is formed as an annular segment of an internal surface in engagement with the spherical surface of the male coupling portion or member at a single line of tangency; and (3) a clamping means. The outer face of side of the female coupling assembly is also formed as an annular segment of a spherical surface. The clamping means has an annular segment of an internal surface which engages the spherical surface on the outer face of the female coupling assembly with a circular line contact and so urges the contacting surfaces of all of the coupling members into sealed engagement with each other. The inner surface of the female coupling assembly is thus held in sealed engagement at a single line of tangency with the outer surface of the male member and the clamping means is held in sealed engagement at a single line of tangency with the outer surface of the female coupling assembly. The center arcs of the two above mentioned spherical surfaces are coincident whereby substantial rotational sliding engagement occurs between such spherical surfaces and their respective confronting surfaces so as to permit the clamping means to draw the male coupling member and the female coupling assembly together into sealed relationship notwithstanding misalignment of the longitudinal axes of the coupling portions. As in copending application Serial No. 822,508 the coupling assembly of the present invention provides in addition to the arrangement described in the last paragraph, the formation of the opposite end of the male member of the coupling as a hollow cylinder or sleeve and provides in addition to the disclosure of such copending application arrangements whereby the beaded or flanged ends of aircraft tubing may slide longitudinally within the hollow cylinder or sleeve of the male member of the coupling in fluid tight relationship so as to provide take-up for longitudinal mismatch and to provide for expansion and/or contraction of materials due to temperature changes.

It is an object of the present invention to provide a novel coupling assembly for joining aircraft type tubing whether of the flanged or beaded type, into fluid tight relationship notwithstanding the fact that they are slightly misaligned and/or the fact that they are not positioned exactly at a definite longitudinal distance apart and to maintain such fluid tight relationship notwithstanding longitudinal or radial movement of one of the two pieces of tubing, relative to the other while in use (e.g. movement caused by movement of an aircraft wing during flight in turbulent air).

It is a further object of my invention to provide novel clamping means for aircraft tubing having either beaded ends or flaring ends for joining together two lengths of such tubing by a coupling which provides novel take-up arrangement for longitudinal mismatch and for longitudinal expansion and/or contraction of materials due to temperature changes and otherwise.

It is a further object of my invention to provide a novel securing means for securing aircraft tubing having either beaded ends or flared ends to a coupling device for joining together two lengths of such tubing which are approximately aligned with each other, but which may be slightly misaligned and/or which may be spaced apart from each other varying distances.

Further objects and features of my invention will be apparent from a consideration of the following specification and claims when considered in connection with the accompanying drawings which illustrate several embodiments of my invention.

In the drawings illustrating the embodiments of my invention:

FIG. 1 is a view in elevation of a pair of aircraft conduits each having beaded ends connected together by a novel coupling constructed in accordance with my invention;

FIG. 2 is a view in vertical section of the structure shown in FIG. 1;

FIG. 3 is a view partially in perspective and partially in section showing the structure of FIGS. 1 and 2 in expanded condition for a more clearly illustrated disclosure thereof;

Figure 4:
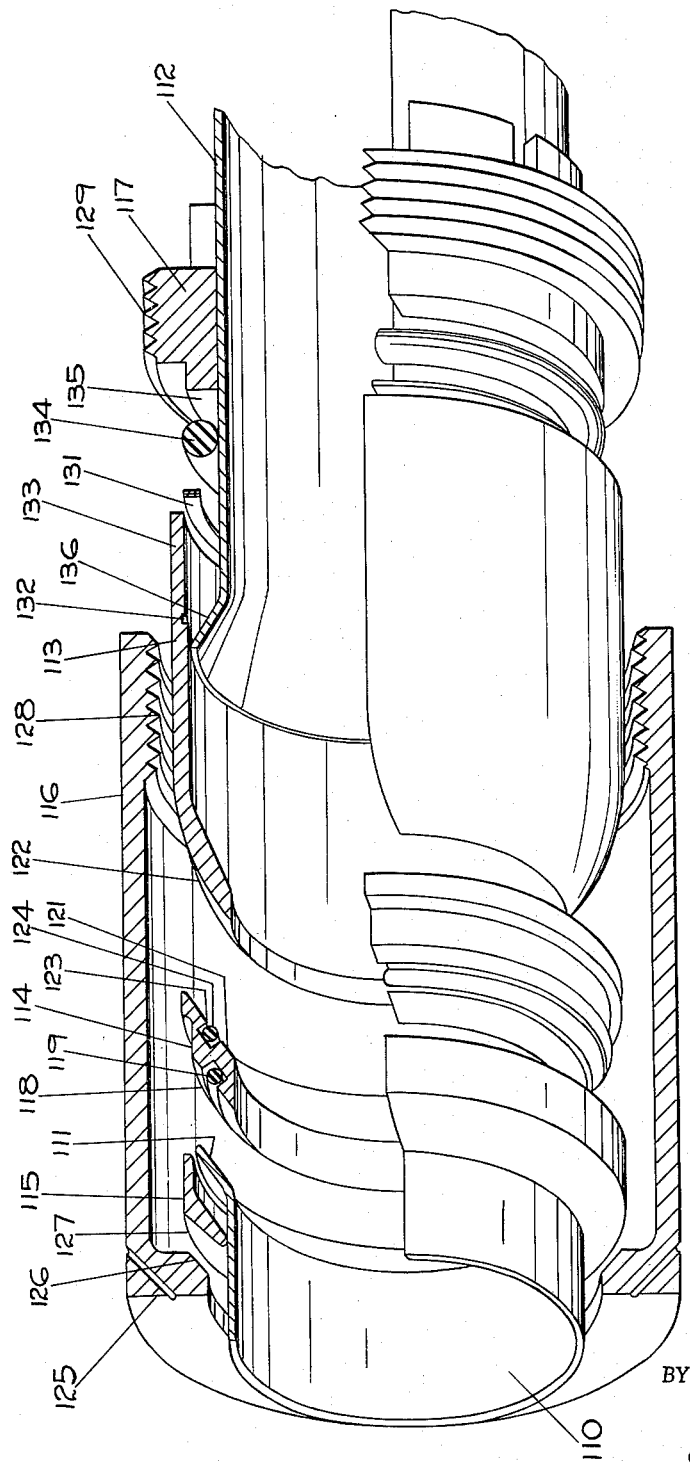
FIG. 4 is a view similar to FIG. 3 showing a similar construction provided for the purpose of joining together two sections of aircraft tubing shown therein which have flared ends rather than beaded ends.

Referring especially to FIGS. 1, 2 and 3, it may be seen that I have shown a pair of beaded aircraft conduits 10 and 12 and a coupling therefor. The means for coupling the conduits 10 and 12 comprises a male coupling member 13, a pair of intermediate members 14 and 15, a clamping sleeve or member 16, and a threaded ring 17. These are the main members of the coupling means. Intermediate members 14 and 15 cooperate to secure the end of the conduit 10 in fluid tight relationship as is shown most clearly in FIG. 2. In achieving this purpose the O ring 18 positioned in the groove 19 aids in the sealing between the beaded end 11 of the conduit 10 and the coupling device.

The coupling is reversible so that fluid may flow either from the conduit 10 to the conduit 12 or from the conduit 12 to the conduit 10 through the coupling. However, for the purposes of description and disclosure, the conduit 10 is described as being at the forward end of the coupling and the conduit 12 at the rearward end of the coupling. The male member 13 of the coupling is formed at its forward end as an annular segment of a spherical surface as at 22 and the rearward end of the intermediate member 14 is formed as an annular segment of the interior surface of a cone as at 21 except for the groove 23. Within the groove 23 I position an O ring 24 which when the coupling is clamped together seals against the surface 22.

The forward end of the clamping sleeve 16 is formed with an inwardly turned flange 25 and this inwardly turned flange is formed with an inwardly facing cooperating surface 26 formed as an annular segment of the interior surface of a cone which is adapted to engage the spherical surface 27 at the forward end of the intermediate member 15. The surface 27 is an outwardly facing annular segment of a spherical surface which cooperates with the surface 26 in clamping the parts together to form a line contact therewith. The annular spherical surface 27 and the annular spherical surface 22 are concentric. The surface 27 has obviously a larger diameter than the surface 22.

The clamping sleeve 16 is interiorly threaded as at 28 and cooperates with exterior threads 29 formed on the ring 17, to secure the parts in assembled relationship. The snap ring 31 fits in a groove 32 formed in the rearwardly extending sleeve 33 of the male member of the coupling 13 and provides a backing against which stops the bead 36 so as to prevent injury to the O ring 34 when the tube 12 is moved to its limit in a rearwardly direction.

The tubing 12 is formed with a bead 36 which is positioned in the sleeve 33 forward of the groove 32 so that the conduit 12 may slide freely within the sleeve 33 to adjust for longitudinal mismatch, while the O ring 34 compressed as it is between the snap ring 31, annular ridge 35, the sleeve 33, and the conduit 12 effectively seals any escape of fluid from the conduit 12 or from the coupling.

The intermediate members 14 and 15 are rigidly clamped with the conduit 10 so that the three parts operate as a unit. By reason of the cooperation between the surfaces 27 and 26, and between the surfaces 21 and 22, the tubing 10 with the assembly consisting of the members 14 and 15 may be rotated relative to the tubing 12 to adjust for axial misalignment, while the tubing and the coupling are continuously effectively sealed against fluid leakage.

Referring now to FIG. 4, it may be seen that I have shown aircraft tubing 110 having a flared end 111 and aircraft tubing 112 having a flared end 136. The coupling for these two aircraft tubings comprises a male member 113 having a groove 132 and a forward end 122 formed as an annular segment of a spherical surface. I have shown an intermediate member 114 formed with grooves 119 and 123. I have shown a second intermediate member 115 formed with an annular segment of a spherical surface at 127. Intermediate member 114 is formed on its rearward surface as the annular segment of the interior surface of a cone as at 121. The surfaces of the members 114 and 115 facing each other (i.e. the surface of the member 114 opposite to the surface 121, and the surface of the member 115 opposite to the surface 127) are formed as mating surfaces so that they clamp the flange 111 of the tubing 110 tightly between them. To aid in the sealing there is provided an O ring 118 which fits in the groove 119. The surface 121 contacts the surface 122 with a line contact and forms an effective seal by means of the O ring 124 seated in the groove 123. The clamping member or sleeve 116 is provided with an inwardly turned flange 125 the interior surface 126 of which is formed as an annular segment of the interior surface of a cone. The clamping sleeve 116 is also formed with interior threads 128 which cooperate with the exterior threads 129 of the clamping ring 117 to secure the parts together.

A snap ring 131 fits in the groove 132 and retains the O ring 134 from movement in a forward direction. The O ring 134 is contained between the annular ridge 135, the snap ring 131, the sleeve 133 and the tubing 112.

The operation of these embodiments of my invention is obvious from the above. The parts are assembled by clamping the male member 13—113 together with the intermediate members 14 and 15 or 114 and 115, together with the tubing 10 or 110 by means of the clamping sleeve 16 or 116. The clamping sleeve 16 is secured by screwing it onto the clamping ring 17 and the clamping sleeve 116 is secured by screwing it onto the clamping ring 117. The clamping rings 17 and 117 bear forwardly on the rear end of the sleeves 33 and 133 which in turn bear on the intermediate members 14 and 114.

The forward end of the intermediate member 14 bears on the bead 11 of the tubing 10 on one side and the rearward end of the intermediate member 15 bears on the bead 11 on the opposite side. The intermediate members 14 and 15 and the bead 11 between them form an assembly which at its rear end in effect is a female member having a socket in which the spherical surface of the male member 22 fits at its rear end. The assembly forms as an annular segment of a spherical surface which cooperates with the surface 26 on the flange 25 of the sleeve 16.

Similarly the intermediate members 114 and 115 clamp between them the flare 111 of the tubing 110 and together form a unitary assembly having a female surface 121 at its rear end which cooperates with the annular segment of a spherical surface 122 of the male member 113 and at its forward end having a male surface 127 which is formed as an annular segment of a spherical surface and cooperates with the female surface 126 of the flange 125 of the sleeve 116.

Thus the intermediate member 114 bears forwardly on the flare 111, then on the intermediate member 115 and finally on the surface 126 of the flange 125 of the clamping member 116. While the parts are clamped together in fluid tight relationship, the tubing 10 and 12 or the tubing 110 and 112 may be rotated relative to each other about the axes of the spherical surfaces 22 and 27 (or 122 and 127) as each group has a common center without disturbing the sealing contact by reason of the line contact between the surfaces 26 and 27 (or 126—127) and 21 and 22 (or 121, 122) respectively. At the same time the conduits 10 and 12 (or 110 and 112) may be moved longitudinally relative to each other inasmuch as the conduits 12 and 112 may slide within the sleeves 33 and 133 without destroying the seal by reason of the O rings 34 and 134.

It is to be understood that the above described embodiments of my invention are for the purpose of illustration only and various changes may be made therein without departing from the spirit and scope of the invention.

I claim:

1. A coupling for use in joining a pair of lengths of aircraft tubing together in fluid tight relationship, each such length having an enlargement adjacent to one end thereof; said coupling comprising a female assembly consisting of a pair of annular members clamped together as a unit with the enlargement of one of said lengths of tubing clamped between them, said assembly having a first face formed as an annular segment of the internal surface of a cone and said assembly having a second face formed as an annular segment of a spherical surface; a male coupling member having a first surface formed as an annular segment of a spherical surface and cooperating to contact the said first conical face of said assembly along a line contact in fluid tight sealed relationship therewith, and formed with an oppositely extending sleeve into which the end of the other length of aircraft tubing having the enlargement adjacent thereto is slidably fitted; means for sealing said second length of aircraft tubing in fluid tight relationship within said oppositely extending sleeve; and means for securing said first named length of aircraft tubing, said female assembly, said male member, and said sealing means together in clamped and sealed relationship.

2. A coupling for use in joining a pair of lengths of aircraft tubing together in fluid tight relationship, each such length having a flare adjacent to one end thereof; said coupling comprising a female assembly consisting of a pair of annular members clamped together as a unit with the flare of one of said lengths of tubing clamped between them, said assembly having a first face formed as an annular segment of the internal surface of a cone and said assembly having a second face formed as an annular segment of a spherical surface; a male coupling member having a first surface formed as an annular segment of a spherical surface and cooperating to contact the said first conical face of said assembly along a line contact in fluid tight sealed relationship therewith, and formed with an oppositely extending sleeve into which the end of the other length of aircraft tubing having the flare adjacent thereto is slidably fitted; means for sealing said second length of aircraft tubing in fluid tight relationship within said oppositely extending sleeve; and means for securing said first named length of aircraft tubing, said female assembly, said male member, and said sealing means together in clamped and sealed relationship.

3. A coupling for use in joining a pair of lengths of aircraft tubing together in fluid tight relationship, each such length having a bead adjacent to one end thereof; said coupling comprising a female assembly consisting of a pair of annular members clamped together as a unit with the bead of one of said lengths of tubing clamped between them, said assembly having a first face formed as an annular segment of the internal surface of a cone and said assembly having a second face formed as an annular segment of a spherical surface; a male coupling member having a first surface formed as an annular segment of a spherical surface and cooperating to contact the said first conical face of said assembly along a line contact in fluid tight sealed relationship therewith, and formed with an oppositely extending sleeve into which the end of the other length of aircraft tubing having the bead adjacent thereto is slidably fitted; means for sealing said second length of aircraft tubing in fluid tight relationship within said oppositely extending sleeve; and means for securing said first named length of aircraft tubing, said female assembly, said male member, and said sealing means together in clamped and sealed relationship.

4. A coupling for use in joining a pair of lengths of aircraft tubing together in fluid tight relationship, each such length having an enlargement adjacent one end thereof, said coupling comprising a female assembly consisting of a pair of annular members clamped together as a unit with the enlargement of one of said lengths of tubing clamped between them, said assembly having a first face formed as an annular segment of the internal surface of a cone and said assembly having a second face formed as an annular segment of a spherical surface; a male coupling member having a first surface formed as an annular segment of a spherical surface concentric with the spherical surface of the second face of the female assembly and cooperating to contact the said first conical face of said assembly along a line contact in fluid tight sealed relationship therewith, and formed with an oppositely extending sleeve into which the end of the other length of aircraft tubing having an enlargement adjacent thereto is slidably fitted; means comprising an O ring for sealing said second length of aircraft tubing in fluid tight relationship within said oppositely extending sleeve; and means comprising a flanged threaded metal sleeve and a nut therefor, for securing said first named length of aircraft tubing, said female assembly, said male member, and said sealing means together in clamped relationship.

5. A coupling comprising a female assembly consisting of a pair of annular members clamped together as a unit, said assembly having a first face formed as an annular segment of the internal surface of a cone and said assembly having a second face formed as an annular segment of a spherical surface; a male coupling member having a first surface formed as an annular segment of a spherical surface and cooperating to contact the said first conical face of said assembly along a line contact in fluid tight sealed relationship therewith, and formed with an oppositely extending sleeve; and means for securing said female assembly and said male member together in clamped relationship.

6. A coupling for use in joining a pair of aircraft tubing together in fluid tight relationship, each such length having an enlargement adjacent to one end thereof; said coupling comprising a female assembly consisting of a pair of annular members clamped together as a unit with the enlargement of one of said lengths of tubing clamped between them, said assembly having a first face formed generally as an annular segment of the internal surface of a cone but having a groove formed therein, said assembly having a second face formed as an annular segment of a spherical surface, and said assembly having an O-ring in said groove; a male coupling member having a first surface formed as an annular segment of a spherical surface and cooperating to contact the O-ring of the said first conical face of said assembly along a line contact in fluid tight sealed relationship therewith, and formed with an oppositely extending sleeve into which the end of the other length of aircraft tubing having the enlargement adjacent thereto is slidably fitted; means for sealing said second length of aircraft tubing in fluid tight relationship within said oppositely extending sleeve; and means for securing said first named length of aircraft tubing, said female assembly, said male member, and said sealing means together in clamped and sealed relationship.

7. A coupling for use in joining a pair of lengths of aircraft tubing together in fluid tight relationship, each such length having an enlargement adjacent to one end thereof; said coupling comprising a female assembly consisting of a pair of annular members clamped together as a unit with the enlargement of one of said lengths of tubing clamped between them, said assembly consisting (1) of a first member having a first face formed generally as an annular segment of the internal surface of a cone but having a groove formed therein and having a second face formed generally to conform to the shape of the enlargement but having a groove formed therein and (2) of a second member having a first face formed generally to conform to the shape of the enlargement and having a second face formed as an annular segment of a spherical surface and said assembly having an O-ring in each of said grooves; a male coupling member having a first surface formed as an annular segment of a spherical surface and cooperating to contact the O-ring of the said conical face of said assembly along a line contact in fluid tight sealed relationship therewith, and formed with an oppositely extending sleeve into which the end of the other length of aircraft tubing having the enlargement adjacent thereto is slidably fitted; means for sealing said second length of aircraft tubing in fluid tight relationship within said oppositely extending sleeve; and means for securing said first named length of aircraft tubing, said female assembly, said male member, and said sealing means together in clamped and sealed relationship.

8. A coupling for use in joining a pair of lengths of fluid tubing together in fluid tight relationship, each such length having an enlargement adjacent to one end thereof; said coupling comprising a female assembly consisting of a pair of annular members clamped together as a unit with the enlargement of one of said lengths of tubing clamped between them, said assembly having one face formed as an annular segment of a spherical surface; a male coupling member having one surface cooperating to contact one face of said assembly along a line contact in fluid tight sealed relationship therewith, and formed with an oppositely extending sleeve into which the end of the other length of aircraft tubing having the enlargement adjacent thereto is slidably fitted, one of said contacting faces being formed as an annular segment of a spherical surface and the other contacting surface having a soft sealing contact surface sealing with said annular segment; means for sealing said second length of aircraft tubing in fluid tight relationship within said oppositely extending sleeve; and means for securing said first named length of fluid tubing, said female assembly, said male member, and said sealing means together in clamped and sealed relationship.

9. A coupling comprising a female assembly consisting of a pair of annular members clamped together as a unit, said assembly having one face formed as an annular segment of a spherical surface; a male coupling member having one surface cooperating to contact one face of said assembly along a line contact in fluid tight sealed relationship therewith, and formed with an oppositely extending sleeve, one of said contacting faces being formed as an annular segment of a spherical surface and the other contacting surface having a soft sealing contact surface sealing with said annular segment; and means for securing said female assembly and said male member together in clamped relationship.

References Cited in the file of this patent

UNITED STATES PATENTS

| | | |
|---|---|---|
| 233,412 | Harvey | Oct. 19, 1880 |
| 1,367,348 | Barnes | Feb. 1, 1921 |
| 1,494,693 | Loi | May 20, 1924 |
| 2,040,008 | Dreidel | May 5, 1936 |
| 2,383,679 | Phillips | Aug. 28, 1945 |
| 2,502,753 | Rohr | Apr. 4, 1950 |
| 2,520,501 | Guiler | Aug. 29, 1950 |
| 2,918,313 | Lazar | Dec. 22, 1959 |